(12) United States Patent
Rohrer et al.

(10) Patent No.: US 10,212,890 B2
(45) Date of Patent: Feb. 26, 2019

(54) APPARATUS FOR CONVERTING LARGE BALES OF FORAGE MATERIAL INTO SMALL RECTANGULAR BALES OF FORAGE MATERIAL

(71) Applicant: Gerald E. Rohrer, Cochranville, PA (US)

(72) Inventors: Gerald E. Rohrer, Cochranville, PA (US); Stevie A. Stoltzfus, Cochranville, PA (US)

(73) Assignee: Gerald E. Rohrer, Cocharanville, PA (US)

( * ) Notice: Subject to any disclaimer, the term of this patent is extended or adjusted under 35 U.S.C. 154(b) by 957 days.

(21) Appl. No.: 14/713,417

(22) Filed: May 15, 2015

(65) Prior Publication Data

US 2015/0327443 A1    Nov. 19, 2015

Related U.S. Application Data

(60) Provisional application No. 62/000,143, filed on May 19, 2014.

(51) Int. Cl.
| | |
|---|---|
| *A01F 29/04* | (2006.01) |
| *A01F 29/10* | (2006.01) |
| *A01F 29/00* | (2006.01) |
| *A01F 29/12* | (2006.01) |
| *A01F 15/00* | (2006.01) |

(52) U.S. Cl.
CPC ............ *A01F 29/04* (2013.01); *A01F 15/005* (2013.01); *A01F 29/005* (2013.01); *A01F 29/10* (2013.01); *A01F 29/12* (2013.01)

(58) Field of Classification Search
CPC ........ A01F 29/005; A01F 29/01; A01F 29/02; A01F 29/10; A01F 29/12
USPC ............................................ 241/605, 101.74
See application file for complete search history.

(56) References Cited

U.S. PATENT DOCUMENTS

| | | | | |
|---|---|---|---|---|
| 4,187,990 A | * | 2/1980 | Lundahl ............... | A01D 90/105 241/101.3 |
| 4,195,958 A | * | 4/1980 | Vahlkamp ............ | A01D 87/127 241/101.71 |
| 4,420,119 A | * | 12/1983 | Johnson .................. | A01F 25/14 241/101.4 |

(Continued)

*Primary Examiner* — Faye Francis
(74) *Attorney, Agent, or Firm* — Miller Law Group, PLLC (57) ABSTRACT

An apparatus for disintegrating large rectangular bales of forage or bedding material and reforming the disintegrated material into small rectangular bales includes an inclined conveyor having spikes projecting therefrom to remove slices of material from the large bale and a spiked roller to move the slice rearwardly onto a tumbler bed that receives the slice and affects disintegration thereof. The tumbler bed includes a plurality of transverse assemblies having disks interleaving with the disks on adjacent assemblies, each assembly rotating faster than the assembly immediately forwardly thereof. The disintegrated material falls through the tumbler bed as discrete components that land on a collecting conveyor that conveys the material rearwardly to a small rectangular baler for repackaging. The apparatus further includes a hold-down mechanism that presses the slices toward the tumbler bed to enhance disintegration. An approach conveyor feeds the large rectangular bales loaded thereon to the inclined conveyor for processing.

19 Claims, 8 Drawing Sheets

(56) References Cited

U.S. PATENT DOCUMENTS

| | | | | |
|---|---|---|---|---|
| 4,657,191 | A * | 4/1987 | Dwyer | A01D 87/127 241/101.762 |
| 5,222,675 | A * | 6/1993 | Stover | A01F 29/005 209/616 |
| 5,322,226 | A * | 6/1994 | Kranefeld | D01G 31/00 19/80 R |
| 5,419,498 | A * | 5/1995 | Rasmussen | D21B 1/08 241/280 |
| 5,590,839 | A * | 1/1997 | Condrey | A01F 29/005 241/186.35 |
| 6,109,552 | A * | 8/2000 | Strankman | A01F 25/2027 241/101.72 |
| 6,227,468 | B1 * | 5/2001 | De Baat | A01F 29/005 241/200 |
| 6,659,377 | B1 * | 12/2003 | Coulter | E04F 21/12 241/236 |
| 7,185,836 | B2 * | 3/2007 | Simpson | A01F 15/005 241/30 |
| 8,371,791 | B2 * | 2/2013 | Kenna | A01D 90/10 198/746 |
| 8,474,740 | B2 * | 7/2013 | Neudorf | A01D 87/127 241/277 |
| 2002/0053614 | A1 * | 5/2002 | Grellner | A01F 29/005 241/30 |
| 2003/0062433 | A1 * | 4/2003 | Hughes | A01D 87/126 241/101.71 |
| 2003/0075629 | A1 * | 4/2003 | Lucas | A01F 29/005 241/277 |

\* cited by examiner

APPARATUS FOR CONVERTING LARGE BALES OF FORAGE MATERIAL INTO SMALL RECTANGULAR BALES OF FORAGE MATERIAL

CROSS-REFERENCE TO RELATED APPLICATIONS

This application claims domestic priority on Applicant's U.S. Provisional Patent Application Ser. No. 62/000,143, filed on May 19, 2014, the content of which is incorporated herein by reference.

FIELD OF THE INVENTION

The present invention relates generally to the conversion of a large bale of forage and bedding material, such as hay or straw, into small rectangular bales of the forage material, and more particularly, to an apparatus for converting the large bale of hay or straw into a stream of material that can be fed into a conventional hay baler for forming small rectangular bales of hay or straw that can be manually handled.

BACKGROUND OF THE INVENTION

The use of large balers, particularly large rectangular balers, to package hay or straw into large bales of the forage or bedding material, enables the producer of the bales to more easily transport the large rectangular bales for sale in the marketplace. The large rectangular bales of hay or straw are typically sized to fit on the bed of a tractor trailer for shipment of large quantities of the forage or bedding material from the site at which the forage crop was grown to the location where the forage crop can be sold in the marketplace. Large rectangular bales will typically weigh between 600 to 900 pounds and, as a result, require mechanization to handle the bales, either to place them on the trailer for transport, or to move them from one trailer to another.

Small rectangular bales of hay or straw will typically weigh between 40 and 60 pounds and, accordingly, can be handled manually without requiring any mechanization to load or unload the small rectangular bales. However, the time required to load a trailer with small rectangular bales is substantially longer than the time required to load a trailer with large rectangular, or even round, bales by using loader mechanization to position the bales on the trailer. As a result, the popularity of placing forage or bedding material, including hay and straw, into large, highly compressed packages has increased. Nevertheless, many consumers of baled forage or bedding materials prefer to have the small rectangular bales in order to facilitate handling at the time of distributing the forage or bedding material to the animals.

It would be desirable to provide a device for reconstructing a large rectangular bale of forage or bedding material into a plurality of small rectangular bales that can be manually handled. It would also be desirable to provide a device that would be operable to disintegrate a large rectangular bale into a stream of loose forage or bedding material that can be fed to a conventional small rectangular baler. It would also be desirable to provide a method of repackaging large rectangular bales of forage or bedding material into small rectangular bales of forage material.

SUMMARY OF THE INVENTION

It is an object of this invention to overcome the disadvantage of the prior art by providing an apparatus that can convert large rectangular bales of forage or bedding material into small rectangular bales that can be handled manually.

It is another object of this invention to provide an apparatus that will disintegrate large rectangular bales of forage or bedding material into discrete components of the material that can be repackaged into smaller bales that can be manually manipulated.

It is a feature of this invention that an inclined conveyor having spikes projecting therefrom pull individual slices of the material from the formed large rectangular bale and elevate the slices for subsequent processing thereof.

It is another feature of this invention that the apparatus is formed with a tumbler bed that extracts discrete components of the material from the slices and allows the discrete components to fall through the tumbler bed to be received by a collecting conveyor.

It is still another feature of this invention that the tumbler bed is formed by a series of tumbler shaft assemblies that are arranged in a generally horizontal array rearwardly of the inclined conveyor, with each tumbler shaft including a plurality of transversely spaced disks having teeth projecting outwardly therefrom to engage and disintegrate the slices of forage or bedding material.

It is an advantage of this invention that each tumbler shaft assembly is operated at a faster rotational speed than the tumbler shaft immediately forwardly thereof.

It is another advantage of this invention that the disks of adjacent tumbler shaft assemblies are placed into an interleaving arrangement.

It is yet another feature of this invention that the rearwardmost tumbler shaft assembly is cooperable with a rake member having tines that projects downwardly between the disks of the rearwardmost tumbler shaft assembly to complete the disintegration of the slice and direct the material downwardly onto the collecting conveyor.

It is still another advantage of this invention that the disintegration of the large rectangular bale slices by the tumbler bed creates a fluffy windrow of forage or bedding material on the collecting conveyor that can be repackaged by a small rectangular baler into smaller bales.

It is still another feature of this invention that an approach conveyor is utilized to load large rectangular bales thereon to be conveyor to the bale disintegration apparatus.

It is yet another advantage of this invention that the apparatus includes a spiked roller that is operated at the same peripheral speed as the slices of material being elevated by the inclined conveyor to place the slices from the inclined conveyor to the tumbler bed.

It is still another advantage of this invention that a hold-down mechanism is formed with downwardly and rearwardly oriented bars to press the slices of forage or bedding material onto the tumbler bed to enhance disintegration thereof.

It is a further advantage of this invention that the interleaved intersection of disks of adjacent tumbler shaft assemblies creates an aggressive disintegration action by downwardly moving teeth on the forward tumbler shaft assembly and the faster upwardly moving teeth of the rearward tumbler shaft assembly.

It is still another object of this invention to provide an apparatus for converting large bales of forage or bedding material into smaller bales which is durable in construction, inexpensive of manufacture, carefree of maintenance, facile in assemblage, and simple and effective in use.

These and other objects, features, and advantages are accomplished according to the instant invention by providing an apparatus for disintegrating large rectangular bales of forage or bedding material and reforming the disintegrated material into smaller rectangular bales. The apparatus includes an inclined conveyor having spikes projecting therefrom to remove slices of material from the large bale and a spiked roller to move the slice rearwardly onto a tumbler bed that receives the slice and affects disintegration thereof. The tumbler bed includes a plurality of transverse assemblies having disks interleaving with the disks on adjacent assemblies with each assembly rotating faster than the assembly immediately forwardly thereof. The disintegrated material falls through the tumbler bed as discrete components that land on a collecting conveyor that conveys the material rearwardly to a small rectangular baler for repackaging. The apparatus further includes a hold-down mechanism that presses the slices toward the tumbler bed to enhance disintegration. An approach conveyor feeds the large rectangular bales loaded thereon to the inclined conveyor for processing.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENT

Referring now to FIGS. 1-5, an overall view of the large bale conversion machine can be seen. Any left, right, upper and lower references are made as a matter of convenience and are determined by standing at the rear or discharge end of the machine 10 and facing the approach conveyor 12 where the large rectangular bales to be converted into a number of smaller bales are positioned to begin the conversion process. The function of the bale conversion machine 10 is to convert a large rectangular bale of forage or bedding material, such as hay or straw, into a number of smaller bales by disintegrating the large bale and conveying the disintegrated forage or bedding material to a conventional small baler 60 for re-baling the forage or bedding material into the smaller rectangular bales. One of ordinary skill in the art will recognize that the large rectangular bales of hay or straw will weigh in the range of 600 to 900 pounds and must be moved by mechanized devices, such as a front end loader on a tractor (not shown).

The large bale conversion machine 10 begins with a horizontal approach conveyor 12 onto which large rectangular bales of forage or bedding material are placed thereon by a mechanized device, such as a front end loader or a skid steer loader. The baler twine used to retain the shape of the large rectangular bale is manually removed to facilitate the subsequent disintegration of the large bale. The approach conveyor 12 has a plurality of slats 13 attached to endless conveyor chains 14 that operate to move the large bale rearwardly toward the bale disintegration apparatus 20. At the rearward end of the approach conveyor 12, the bale conversion machine 10 includes the bale disintegration apparatus 20 that begins with an inclined conveyor 15 oriented preferably at approximately 45 degrees to the horizontal orientation of the approach conveyor 12 to initiate the disintegration process.

The inclined conveyor 15 is supported on the frame 21 of the bale disintegration apparatus 20 and is formed with an endless conveyor 16, preferably a belt conveyor, having a plurality of spikes 17 affixed to slats 18 at spaced intervals along the endless conveyor 16. The spikes 17 engage the end of a large rectangular bale of forage or bedding material and operate to remove a slice of the forage or bedding material from the large rectangular bale, which then falls rearwardly onto the incline conveyor 15 to be conveyed thereby upwardly away from the large bale at the lower end of the incline conveyor 15.

One skilled in the art will recognize that large rectangular bales of forage or bedding material are formed in the same general manner as small rectangular bales by a baler that compresses discrete charges of the forage material into a baling chamber forming slices of forage material until a sufficient number of the slices are collected to create a large rectangular bale of a desired size. These compressed slices of forage material are held together in the large rectangular bale shape by the baler twine. Thus, the spaced slats 18 on the inclined conveyor 15 engage subsequent slices of the forage or bedding material to provide a substantially continuous flow of slices of forage or bedding material moving upwardly by the incline conveyor 15. One skilled in the art will also recognize that the expression of "rectangular bales", whether large or small, is sometimes referred to as "square bales". A primary difference between large bales and small bales is that large bales is that the large bales are too heavy for manual manipulation and require mechanization to handle large rectangular or square bales, while small bales can be moved manually.

Referring now to FIGS. 1-12, the individual slices of the hay or straw are moved vertically and rearwardly by the incline conveyor 15 to the upper end thereof. At the upper end, the bale disintegration apparatus 20 includes a spiked roller 22 oriented transversely to the flow of hay or straw moving upwardly and rearwardly on the incline conveyor 15. The spiked roller 22 is rotated at the same peripheral speed as the slices of hay or straw moving along the inclined conveyor 15 and includes a plurality of rows of spikes 23 that extend radially out of the roller 22 to engage the slices of hay or straw moving over the upper end of the inclined conveyor 15. The function of the spiked roller 22 is to strip the slices of forage or bedding material from the upper end of the inclined conveyor 15 and move the slices rearwardly beneath the spiked roller 22 onto the tumbler bed 30.

The tumbler bed 30 is formed by a series of tumbler shaft assemblies 31-35 extending transversely across the apparatus 20 and being oriented in a rearward succession from one another. The tumbler shaft assemblies 31-35 are driven, as defined in greater detail below, in increasing peripheral speeds as the tumbler shaft assemblies 31-35 are located rearwardly. In other words, the first tumbler shaft assembly 31 is driven at about 30 RPM and each tumbler shaft assembly rearward thereof is driven incrementally faster until the last tumbler shaft assembly 35 is driven at about 80 RPM.

Each tumbler shaft assembly 31-35 is formed with a central shaft 36 on which is mounted a plurality of spaced apart disks 37 with each disk 37 having a plurality of radially extending teeth 38 connected to the respective disk 37 and projecting outwardly therefrom to aggressively engage the slices of forage or bedding material moving across the tumbler bed 30 by the rotation of the tumbler shaft assemblies 31-35. The disks 37 of each of the tumbler shaft assemblies 31-35 are located between the disks of the adjacent tumbler shaft assembly 31-35 to form an interleaved relationship between the respective disks 37. In the way of an example, the first, third and fifth tumbler shaft assemblies 31, 33 and 35 can have twelve transversely spaced disks 37 on the central shaft 36, while the even numbered tumbler shaft assemblies 32, 34 could have eleven transversely spaced disks 37 with each of the disks 37 on the even tumbler shaft assemblies 32, 34 being positioned between the corresponding disks 37 on the adjacent tumbler shaft assemblies 31, 33 and 35.

With each rearward tumbler shaft assembly rotating faster the tumbler shaft assembly in front of it, the teeth 38 aggressively tear apart the forage or bedding material within the slice as the slice passes over the interleaved area between two adjacent tumbler shaft assemblies 31-35. The dislodged hay or straw falls between the respective disks 37 onto a collecting conveyor 29 located below the tumbler bed 30. By the time the slice of forage or bedding material is conveyed to the last tumbler shaft 35, most of the material has been dislodged from the slice and little remains. At the rearward end of the tumbler bed 30, a rake member 39 is positioned such that the teeth 38 on the last tumbler shaft assembly 35 pass between the rake tines 39a, which provides a final shredding action to the remaining material in the disintegrated slice. The net result is that the forage or bedding material within the slice is disintegrated by the tumbler bed 30 and deposited onto the collecting conveyor 29 in a fluffy condition reminiscent of a windrow of hay or straw in the field when originally harvested and baled. At the end of the collecting conveyor 29, a conventional small rectangular baler 60 is positioned to receive the disintegrated forage or bedding material and re-bale the material into the desired small rectangular bales that are of a size that can be manually manipulated and handled.

Above the tumbler bed 30, a hold down device 40 is supported on the frame 21 of the bale disintegration apparatus 20 and is formed of angled bars 42 that keep the slice of forage or bedding material pressed downwardly against the tumbler bed 30. The hold down device 40 enhances the disintegration action of the progressively increasing speeds of the tumbler shaft assemblies 31-35 by preventing the slice of forage or bedding material from moving upwardly as the upwardly moving teeth 38 engage the slice.

Figure 1:
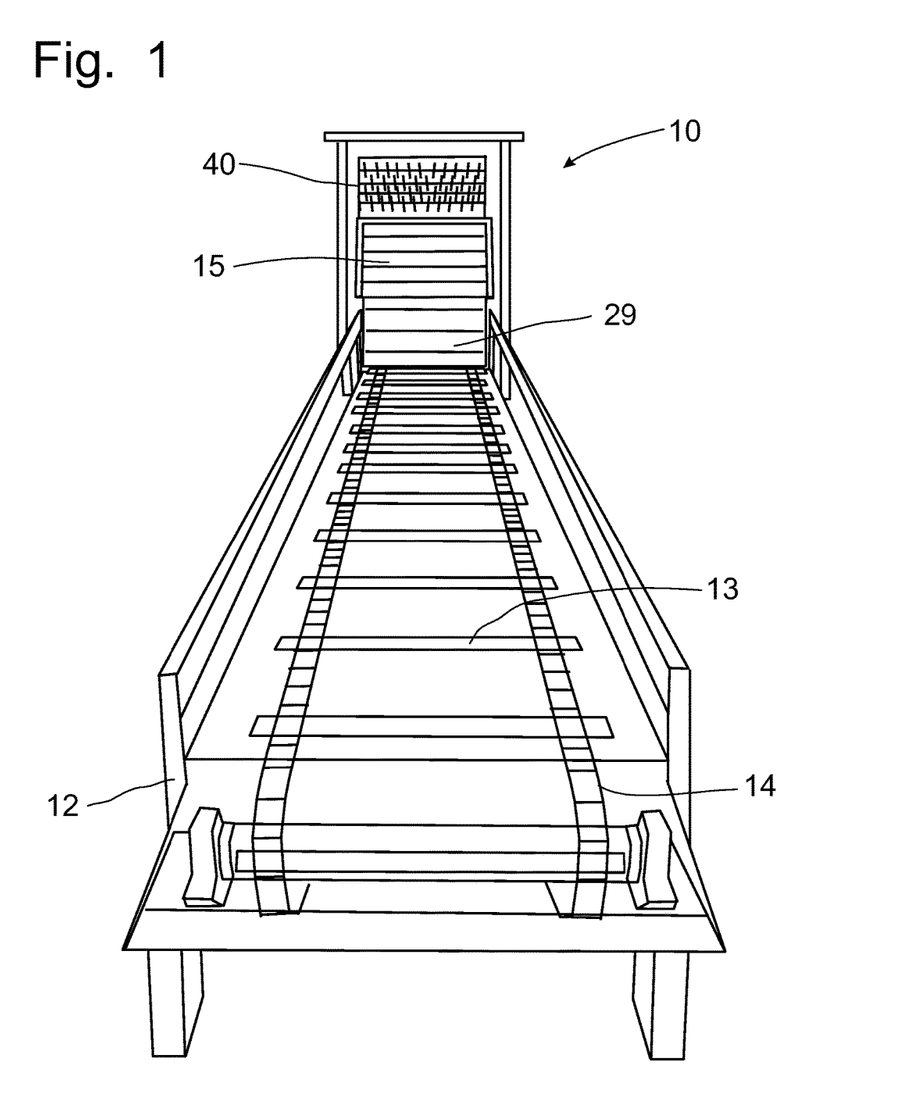
FIG. 1 is a front perspective view of the bale conversion machine including a front view of the approach conveyor and large bale disintegration apparatus incorporating the principles of the instant invention.
Figure 2:
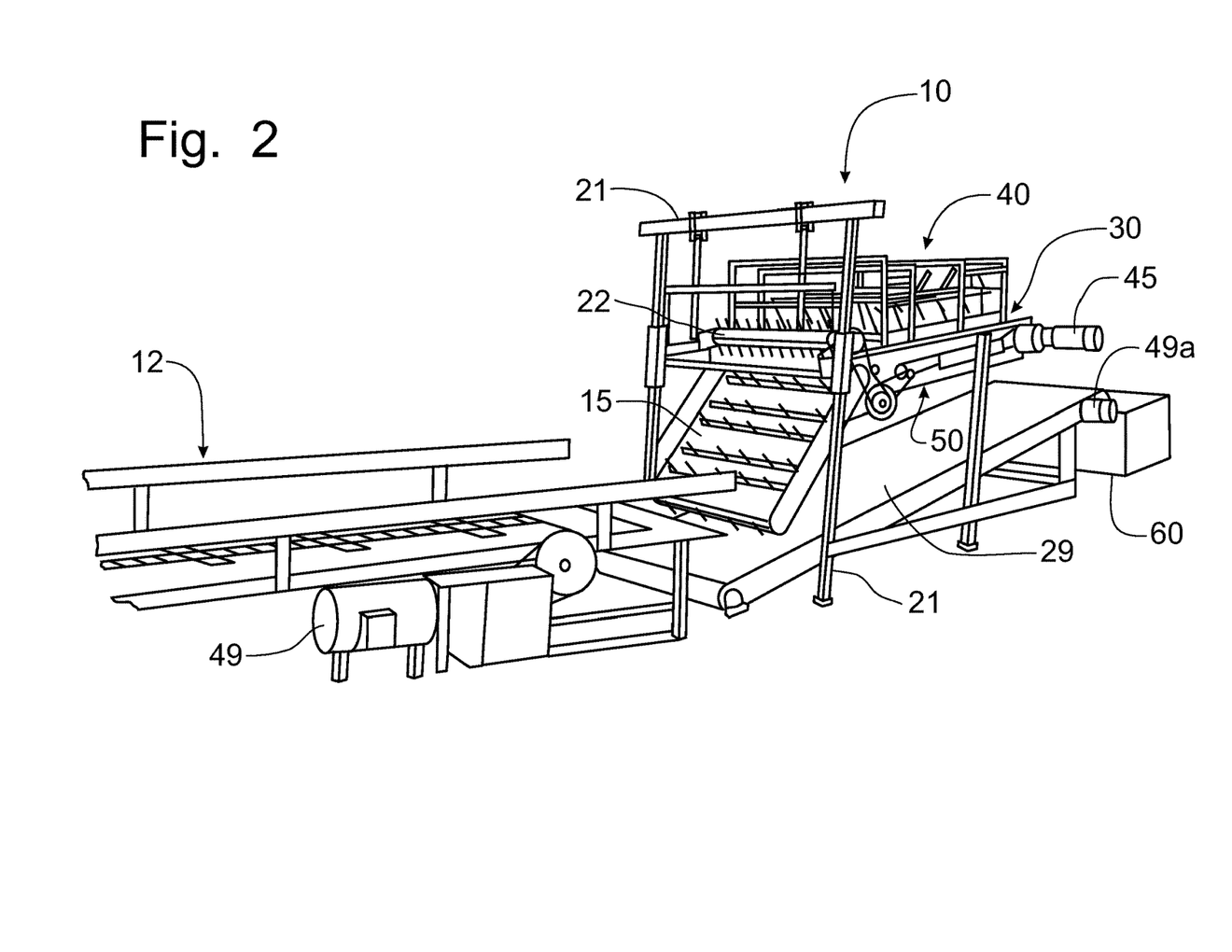
FIG. 2 is a left, front perspective view of the bale conversion machine shown in FIG. 1, the approach conveyor being partially broken away for purposes of clarity of the large bale disintegration apparatus, the small rectangular baling apparatus receiving material from the collecting conveyor being schematically represented at the discharge end of the collecting conveyor.
Figure 3:
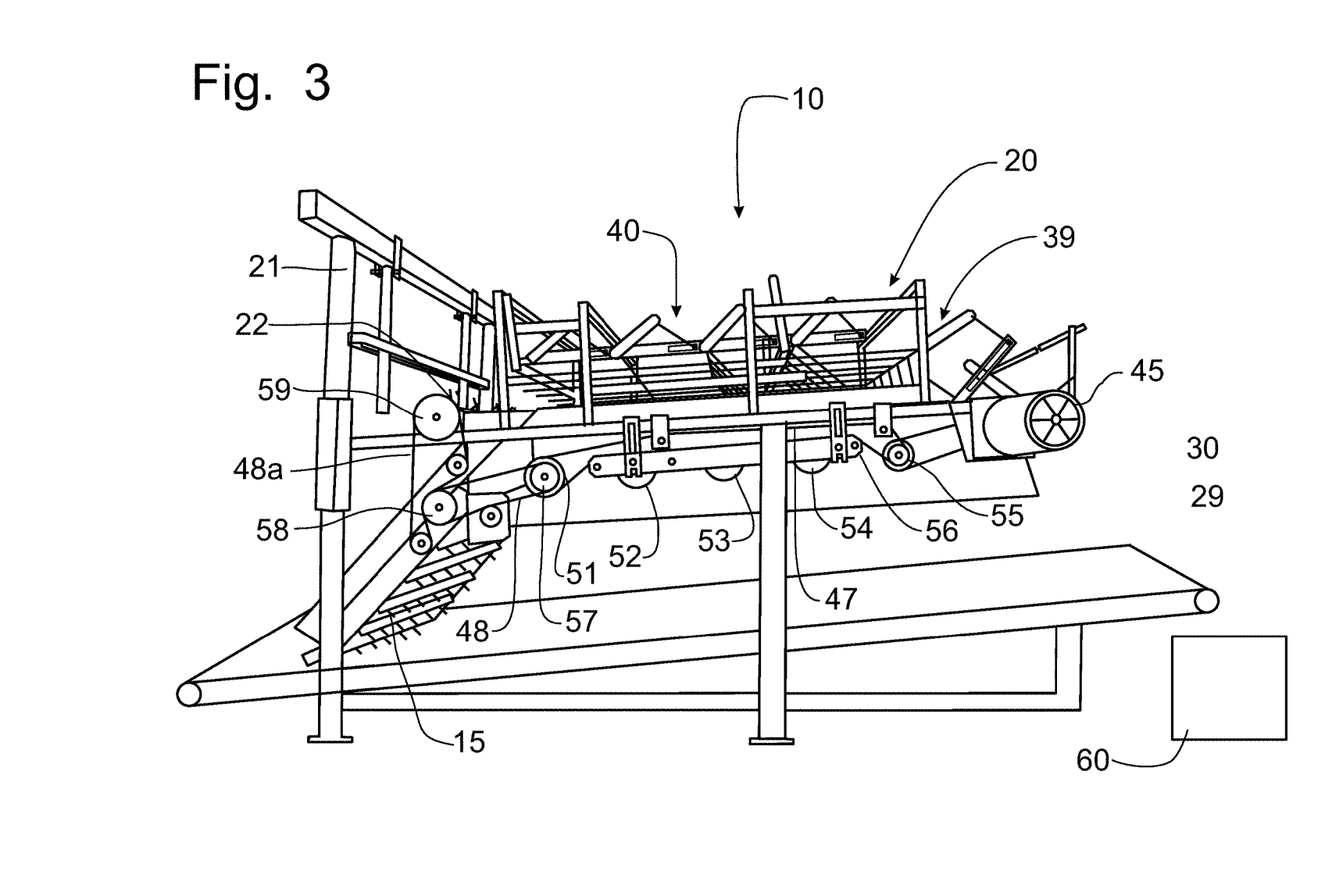
FIG. 3 is a left side perspective view of the large bale disintegration apparatus, the small rectangular baling apparatus being schematically shown at the discharge end of the collecting conveyor.
Figure 4:
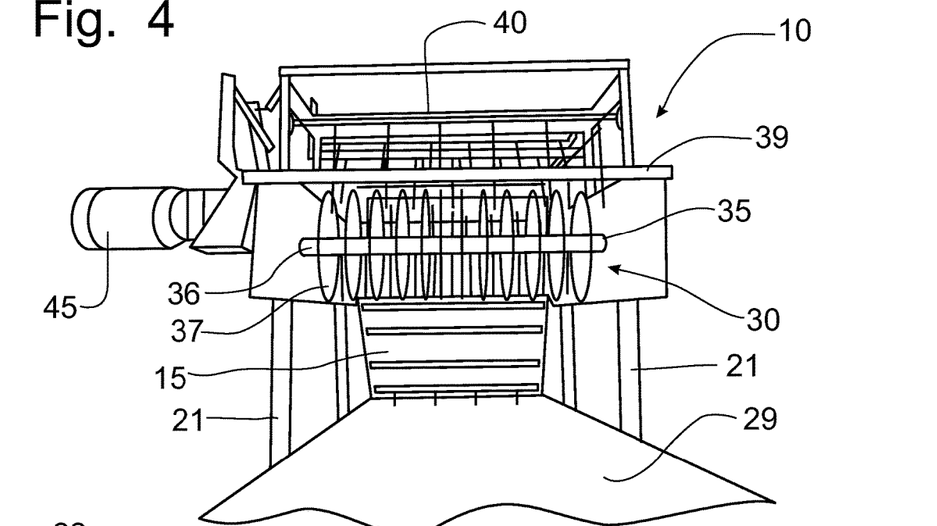
FIG. 4 is a rear perspective view of the large bale disintegration apparatus, the collecting conveyor being partially broken away for purposes of clarity.
Figure 5:
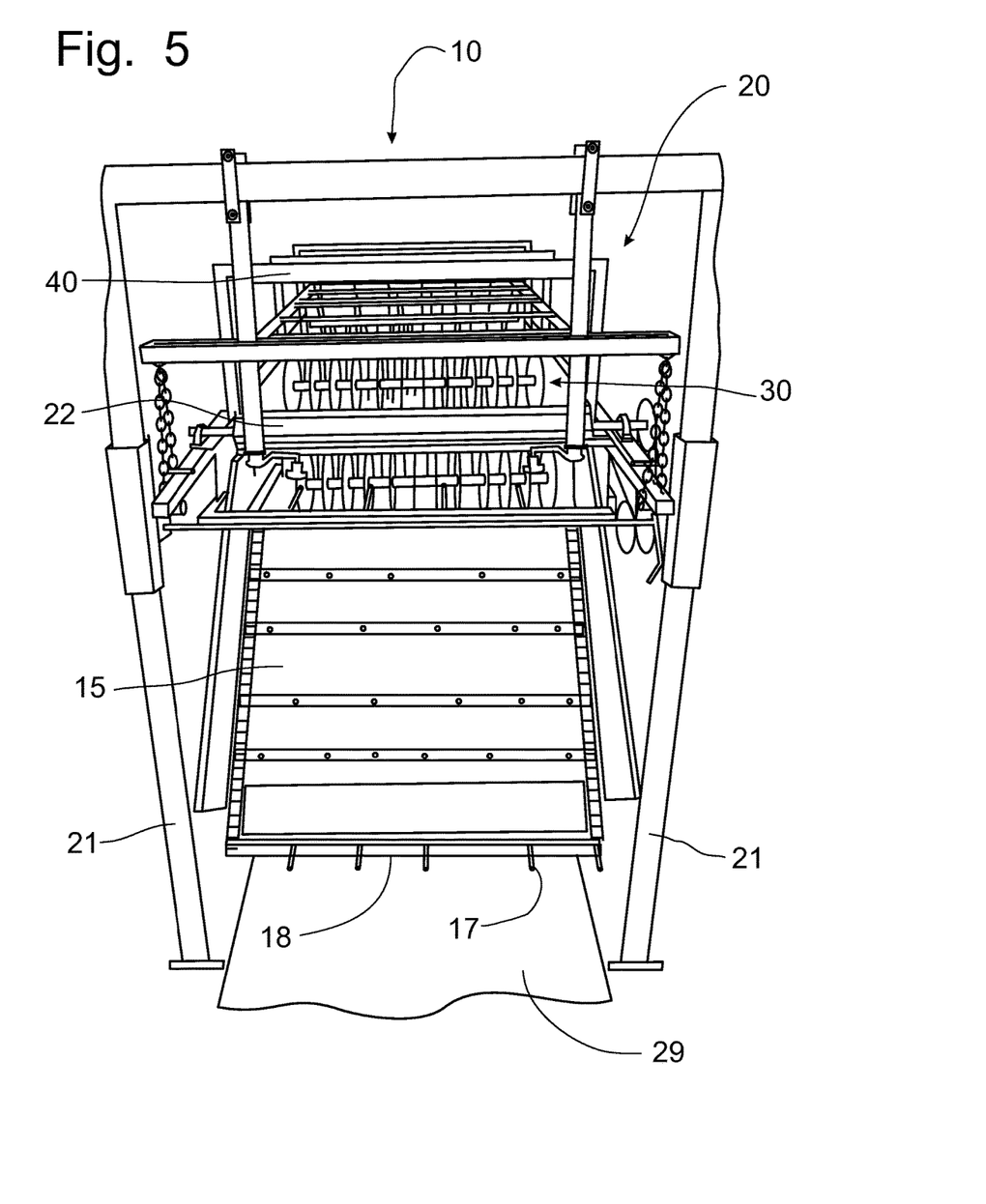
FIG. 5 is an enlarged upper, front perspective view of the large bale disintegration apparatus, the forward end of the collecting conveyor being broken away for purposes of clarity.
Figure 6:
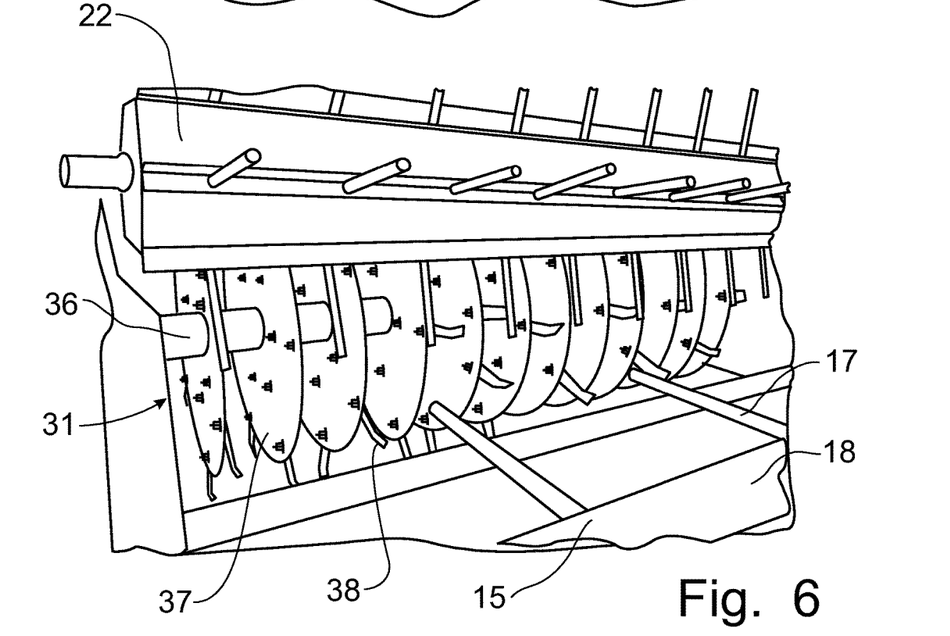
FIG. 6 is an enlarged partial right, front perspective view of the upper end of the inclined conveyor and the spiked roller photograph showing a close-up perspective view of the lower end of the incline conveyor looking through a gap between the upper end of the incline conveyor and the spiked shaft to show the first tumbler shaft.
Figure 7:
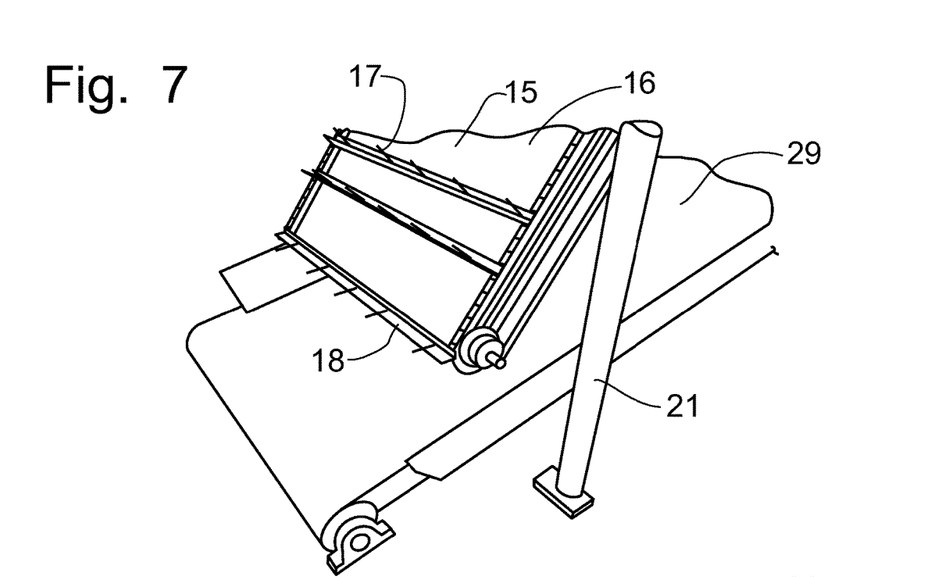
FIG. 7 is an enlarged left, front perspective view of the lower end of the inclined conveyor and the front end of the collecting conveyor.
Figure 8:
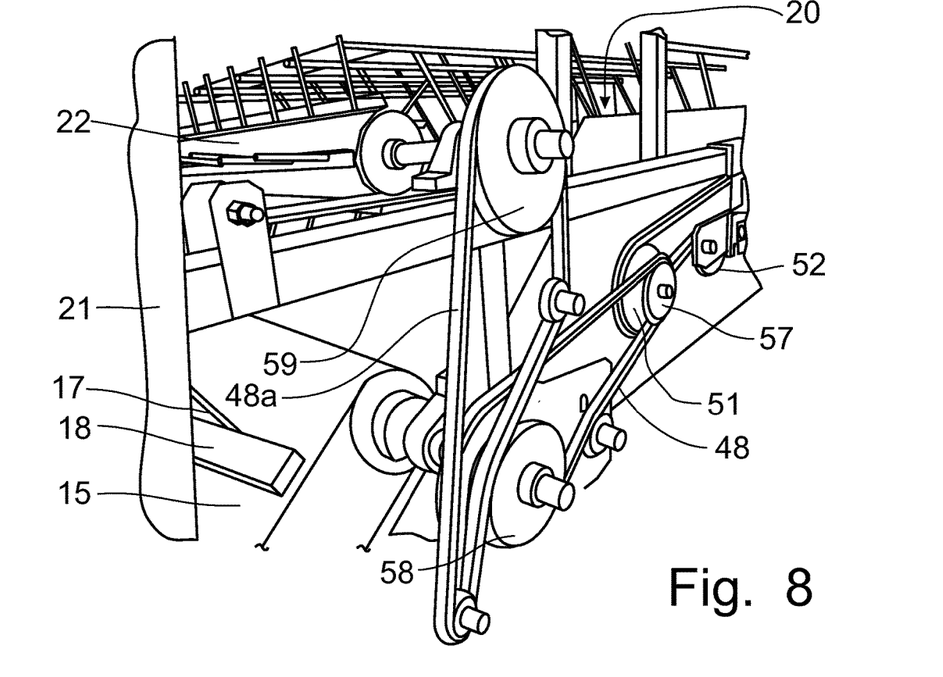
FIG. 8 is an enlarged right, front perspective view of the forward portion of the drive mechanism providing operative power to the spiked roller and the inclined conveyor, as well as the first and second tumbler shafts of the tumbler bed.
Figure 9:
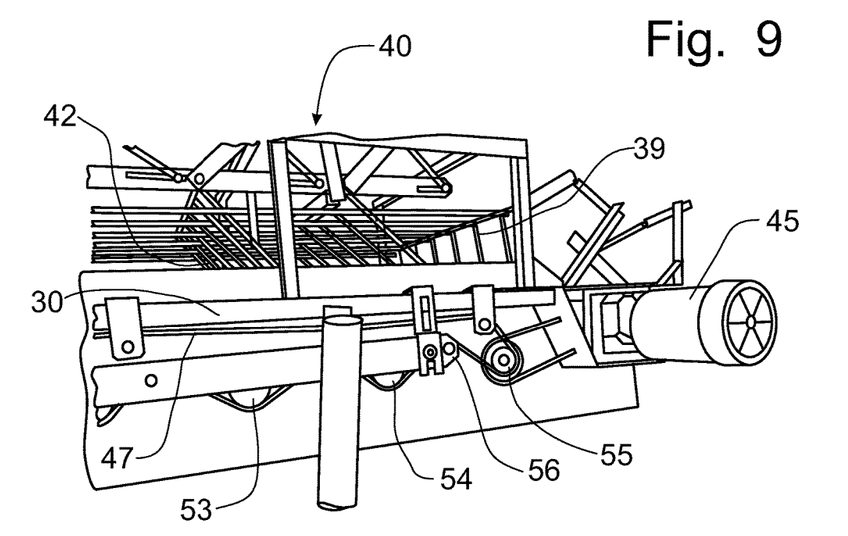
FIG. 9 is an enlarged left side perspective view showing the rearward portion of the drive mechanism providing operative power to the third, fourth and fifth tumbler shafts of the tumbler bed.
Figure 10:
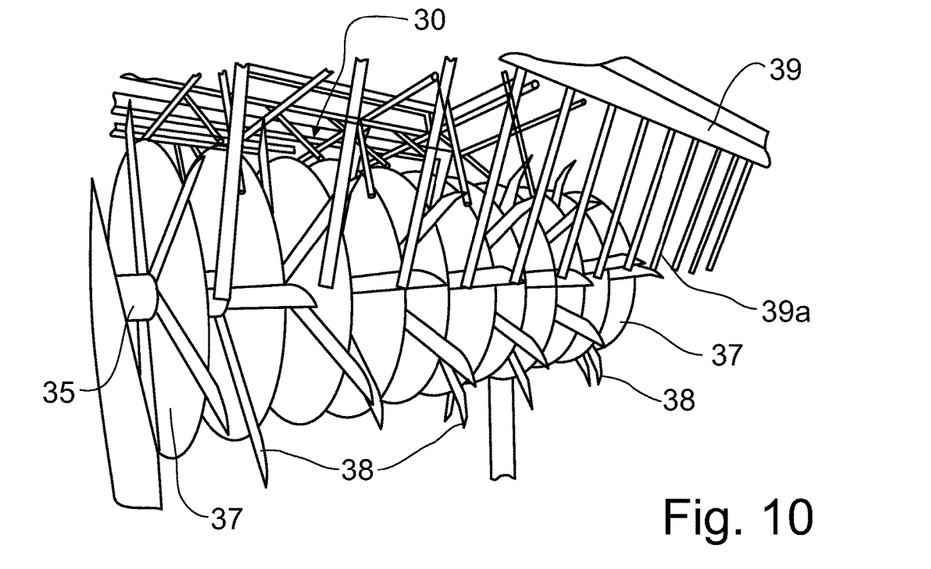
FIG. 10 is an enlarged left, rear perspective of the rearwardmost tumbler shaft and the rake member at the rear of the large bale disintegration apparatus.
Figure 11:
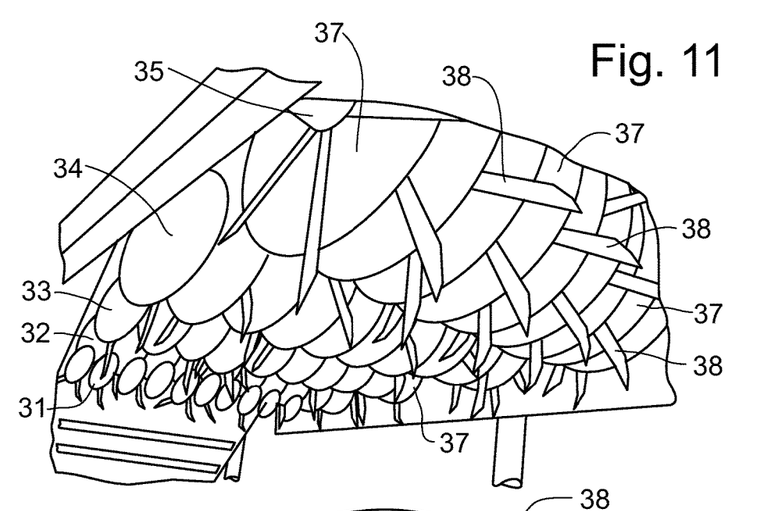
FIG. 11 is an enlarged left, rear perspective view of the tumbler bed showing the lower side thereof and depicting the interleaving action of adjacent tumbler shafts.
Figure 12:
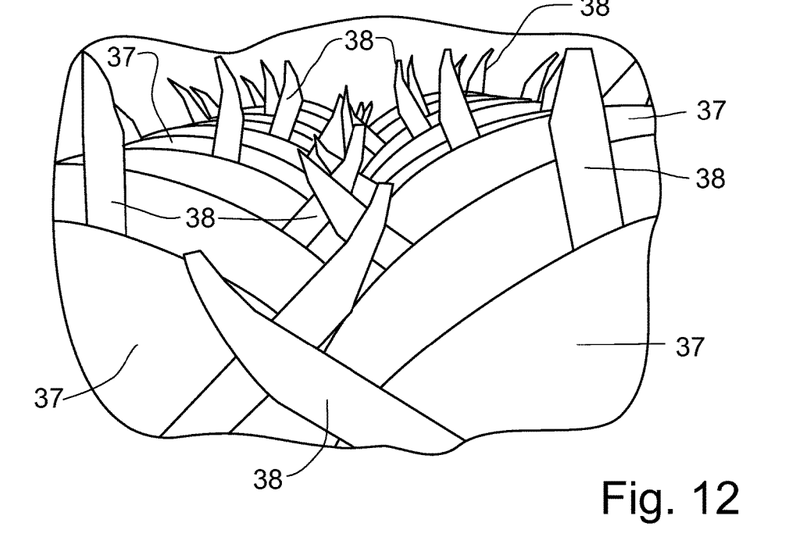
FIG. 12 is an enlarged left side perspective view of a portion of the tumbler bed showing the interleaving relationship of two of the tumbler shafts.

The drive mechanism 50 is best seen in FIGS. 3, 8 and 9. A drive motor 45 is preferably mounted on the rear of the frame 21 of the bale disintegrating apparatus 20. This drive motor 45 can be hydraulically or mechanically powered, but preferably the motor 45 is electrically powered as the bale conversion mechanism 10 is intended to be operated in closed spaces. A chain drive 47 intertwines a sprocket 51-55 on each respective corresponding tumbler shaft assembly 31-35 wherein each sprocket 51-55 has a larger diameter compared to the smaller diameter sprocket immediately rearwardly thereof. In other words, the fifth sprocket 55 on the rearwardmost tumbler shaft 35 is the smallest diameter sprocket and the first sprocket 51 on the forwardmost tumbler shaft 31 is the largest diameter sprocket. With the chain 47 passing around each respective sprocket 51-55 and an idler sprocket 56 between each adjacent pair of drive sprockets 51-55, the chain drive 47 operates all of the tumbler shaft assemblies 31-35 in the same direction, i.e. clockwise when viewed from the left side of the tumbler bed 30, so that the slices of forage and bedding material are conveyed rearwardly over the tumbler bed 30 as the tumbler shaft assemblies 31-35 are rotated.

The forwardmost tumbler shaft 31 also includes a transfer sprocket 57 about which a second chain 48 is entrained to transfer rotation power to a drive sprocket 58 for the inclined conveyor 15 and then by a third drive chain 48a to a drive sprocket 59 affixed to the spiked roller 22 that will assure that the spiked roller 22 is operated at the same speed as the inclined conveyor 15, but in the opposite direction. The approach conveyor 12 and the collecting conveyor 29 can be driven by separate drive motors 49, 49a, and particularly electrically powered drive motors 49, 49a.

In operation, the bale conversion machine 10 receives a supply of large rectangular bales (not shown) of forage or bedding material, such as hay or straw, on the approach conveyor 12 typically placed on the approach conveyor by a mechanized device capable of handling the weight of the large rectangular bales. The baler twine (not shown) holding the large rectangular bale together is removed, preferably manually so that the baler twine is not incorporated into the disintegrated forage or bedding material as processed by the bale conversion machine 10. The approach conveyor 12 moves the large rectangular bales toward the bale disintegration apparatus 20 for processing.

The large rectangular bales are received at the bottom of the inclined conveyor 15 whereby the spikes 17 remove a slice of forage or bedding material from the large rectangular bale, with the slice being typically one to three inches thick, and deposit the removed slice onto the inclined conveyor 15. The inclined conveyor 15 elevates the removed slice to the upper portion of the inclined conveyor 15 where the spiked roller 22 engages the slice and conveys the slice from the upper portion of the inclined conveyor 15 under the spiked roller 22 and onto the tumbler bed 30. Meanwhile, the inclined conveyor 15 continues to remove subsequent slices of forage or bedding material from the supply of large rectangular bales on the approach conveyor 12 to provide a substantially continuous flow of slices elevated on the inclined conveyor 15.

The slice of forage or bedding material passes from the spiked roller 22 to the first tumbler shaft 31 whereupon the teeth 38 on the first tumbler shaft assembly 31 start to remove the hay or straw from the slice. However, a more aggressive disintegration action occurs at the interleaved section between the first and second tumbler shaft assemblies 31, 32 where the teeth 38 on the first tumbler shaft assembly 31 are drawing the hay or straw downwardly while the teeth 38 on the second tumbler shaft assembly 32 are moving upwardly at a greater speed than the teeth 38 on the first tumbler shaft assembly are moving. Similar action happens at each succeeding interleaved area between adjacent tumbler shaft assemblies, as each further rearward tumbler shaft assembly is being rotated faster than the tumbler shaft assembly forwardly thereof. By the end of the tumbler bed 30, most if not all of the hay or straw in the slice has been disintegrated and dropped onto the collecting conveyor 29 immediately below the tumbler bed 30. The rake member 39 at the rear of the tumbler bed 30 catches any remaining forage or bedding material so that the interspersed teeth 38 on the fifth tumbler shaft assembly 35 passing between the rake tines 39a finally disintegrate the slice.

The collector conveyor 29 removes the disintegrated forage or bedding material from the bale disintegration apparatus 20 and delivers the fluffy hay or straw to a rearwardly positioned conventional small rectangular baler 60 that will operate to re-bale the disintegrated forage and bedding material into smaller rectangular bales that can be manually handled and manipulated.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of example, the preferred embodiment described above utilizes chain drive mechanisms to transfer rotational power from the respective electric motors to the driven components of the apparatus 10. Belt drive devices would also provide the function of transferring rotational power, or a combination of chain drives and belt drives. Furthermore, the respective driven components could each be equipped with individual electric, hydraulic or pneumatic drive motors without transferring rotational power from one component to another, or any combination of the above.

Having thus described the invention, what is claimed is:

1. A bale disintegration apparatus for disintegrating a large bale of forage or bedding material formed of individual compressed slices, comprising:
   a frame;
   a feed conveyor to move large bales of forage or bedding material rearwardly;
   an upwardly inclined conveyor for removing individual slices from said large bale delivered thereto by said feed conveyor and elevating said slices to an upper discharge end of said inclined conveyor;
   a tumbler bed supported by said frame and having a plurality of tumbler shaft assemblies arranged in a horizontal array positioned rearwardly of said inclined conveyor to receive said slices elevated by said inclined conveyor, said tumbler bed being operable to disintegrate the elevated slices into discrete components of forage or bedding material that can fall downwardly through said tumbler bed, each said tumbler shaft assembly including a central shaft having mounted thereon a plurality of disks with each disk including at least one tooth projecting outwardly of the disk to engage said slices of forage or bedding material to affect disintegration thereof by removing discrete components thereof to pass between said disks;
   a collecting conveyor operably supported by said frame below said tumbler bed to receive the discrete components of forage or bedding material falling from said tumbler bed, said collecting conveyor discharging said discrete components rearwardly for further processing; and
   a drive mechanism for powering the operation of said inclined conveyor, said tumbler bed and said collecting conveyor.

2. The bale disintegration apparatus of claim 1 wherein each said tumbler shaft assembly is operated at a faster rotational speed than the tumbler shaft assembly immediately forwardly thereof.

3. The bale disintegration apparatus of claim 2 wherein each tumbler shaft assembly includes a drive sprocket connected to said drive mechanism to affect rotation thereof, each said drive sprocket having a smaller diameter than the tumbler shaft assembly drive sprocket immediately forwardly thereof.

4. The bale disintegration apparatus of claim 2 wherein the disks of adjacent tumbler shaft assemblies are interleaved.

5. The bale disintegration apparatus of claim 2 further comprising a spiked roller rotatably mounted on said frame above said upper discharge end of said inclined conveyor to direct said slices of forage or bedding material from said inclined conveyor to said tumbler bed.

6. The bale disintegration apparatus of claim 5 wherein said spiked roller is connected to said drive mechanism to power the rotation thereof, said drive mechanism operating said spiked roller at a peripheral speed substantially equal to a speed at which said inclined conveyor is moving said slices of forage or bedding material.

7. The bale disintegration apparatus of claim 5 further comprising a rake member supported from said frame at a rearward end of said tumbler bed, said rake member having downwardly oriented tines that interleave with corresponding disks on a rearwardmost tumbler shaft assembly to assist in the disintegration of the slices engaged by said rearwardmost tumbler shaft assembly and to direct a remaining forage or bedding material downwardly onto said collecting conveyor.

8. The bale disintegration apparatus of claim 5 further comprising a small rectangular baling machine positioned rearwardly of said collecting conveyor to receive the discrete components of forage or bedding material from said collecting conveyor and affect a repackaging of said forage or bedding material into small rectangular bales.

9. The bale disintegration apparatus of claim 5 further comprising an approach conveyor on which said large bales of forage or bedding material are placed and conveyed to said inclined conveyor.

10. The bale disintegration apparatus of claim 5 further comprising a hold down mechanism supported from said frame above said tumbler bed to keep said slices of forage or bedding material engaged with said tumbler shaft assemblies.

11. The bale disintegration apparatus of claim 10 wherein said hold down mechanism includes a plurality of rearwardly angled and downwardly extending bars that force said slices of forage or bedding material into engagement with said tumbler shaft assemblies.

12. The bale disintegration apparatus of claim 5 wherein said inclined conveyor is formed with a plurality of transversely arrayed spikes mounted on transverse slats affixed to an endless conveyor belt, said spikes pulling individual slices of forage or bedding material from said large bales.

13. An apparatus for converting large rectangular bales of forage or bedding material into small rectangular bales of forage or bedding material, comprising:
a frame;
an upwardly inclined conveyor for removing individual slices from said large bale and elevating said slices to an upper discharge end of said inclined conveyor;
a tumbler bed supported by said frame rearwardly of said inclined conveyor to receive said slices elevated by said inclined conveyor, said tumbler bed being operable to disintegrate the elevated slices into discrete components of forage or bedding material that can fall downwardly through said tumbler bed, said tumbler bed being formed with a plurality of tumbler shaft assemblies arranged in a rearwardly spaced array, each said tumbler shaft assembly including a central shaft having mounted thereon a plurality of disks with each disk including at least one tooth projecting outwardly of the disk to engage said slices of forage or bedding material and remove discrete components thereof to pass between said disks to a collecting conveyor;
a hold down mechanism supported from said frame above said tumbler bed to keep said slices of forage or bedding material engaged with said tumbler shaft assemblies;
said collecting conveyor operably supported by said frame below said tumbler bed to receive the discrete components of forage or bedding material falling from said tumbler bed, said collecting conveyor discharging said discrete components rearwardly for further processing thereof to create said small rectangular bales;
a drive mechanism for powering the operation of said inclined conveyor, said tumbler bed and said collecting conveyor; and
a spiked roller rotatably mounted on said frame above said upper discharge end of said inclined conveyor to direct said slices of forage or bedding material from said inclined conveyor to said tumbler bed, said spiked roller being operatively connected to said drive mechanism to power the rotation thereof such that a peripheral speed of said spiked roller is substantially equal to the speed at which said inclined conveyor is moving said slices of forage or bedding material upwardly to said spiked roller.

14. The apparatus of claim 13 wherein the disks of adjacent tumbler shaft assemblies are interleaved.

15. The apparatus of claim 14 wherein each said tumbler shaft assembly is operated at a faster rotational speed than the tumbler shaft assembly immediately forwardly thereof.

16. The apparatus of claim 13 further comprising a rake member supported from said frame at the rearward end of said tumbler bed, said rake member having downwardly oriented tines that interleave with corresponding disks on a rearwardmost tumbler shaft assembly to assist in the disintegration of the slices engaged by said rearwardmost tumbler shaft assembly and to direct a remaining forage or bedding material downwardly onto said collecting conveyor.

17. The apparatus of claim 16 further comprising a small rectangular baling machine positioned rearwardly of said collecting conveyor to receive the discrete components of forage or bedding material from said collecting conveyor and affect a repackaging of said forage or bedding material into said small rectangular bales.

18. The apparatus of claim 17 wherein said hold down mechanism includes a plurality of rearwardly angled and downwardly extending bars that force said slices of forage or bedding material into engagement with said tumbler shaft assemblies, said inclined conveyor being formed with a plurality of transversely arrayed spikes mounted on transverse slats affixed to an endless conveyor belt, said spikes pulling said individual slices of forage or bedding material from said large bales.

19. A bale disintegration apparatus for disintegrating a large bale of forage or bedding material formed of individual compressed slices, comprising:
a frame;
an upwardly inclined conveyor for removing individual slices from said large bale and elevating said slices to an upper discharge end of said inclined conveyor;
a tumbler bed supported by said frame rearwardly of said inclined conveyor to receive said slices elevated by said inclined conveyor, said tumbler bed being operable to disintegrate the elevated slices into discrete components of forage or bedding material that can fall downwardly through said tumbler bed, said tumbler bed having a plurality of tumbler shaft assemblies arranged in a horizontal array positioned rearwardly of said inclined conveyor to receive said slices elevated by said inclined conveyor, each said tumbler shaft assembly including a central shaft having mounted thereon a plurality of disks with each disk including at least one tooth projecting outwardly of the disk to engage said slices of forage or bedding material to affect disintegration thereof by removing discrete components thereof to pass between said disks, each said tumbler shaft assembly being operated at a faster rotational speed than the tumbler shaft assembly immediately forwardly thereof;
a spiked roller rotatably mounted on said frame above said upper discharge end of said inclined conveyor to direct said slices of forage or bedding material from said inclined conveyor to said tumbler bed;
a collecting conveyor operably supported by said frame below said tumbler bed to receive the discrete components of forage or bedding material falling from said tumbler bed, said collecting conveyor discharging said discrete components rearwardly for further processing;

a rake member supported from said frame at a rearward end of said tumbler bed, said rake member having downwardly oriented tines that interleave with the with corresponding disks on a rearwardmost tumbler shaft assembly to assist in the disintegration of the slices engaged by said rearwardmost tumbler shaft assembly and to direct the remaining forage or bedding material downwardly onto said collecting conveyor; and a drive mechanism for powering the operation of said inclined conveyor, said tumbler bed and said collecting conveyor.

\* \* \* \* \*